UNITED STATES PATENT OFFICE.

CHARLES R. ELY, OF SHELDON, VERMONT.

IMPROVEMENT IN THE PROCESS OF REDUCING IRON CASTINGS AND PREPARING CAST-IRON PATTERNS.

Specification forming part of Letters Patent No. 31,880, dated April 2, 1861.

*To all whom it may concern:*

Be it known that I, CHARLES R. ELY, of Sheldon, in the county of Franklin and State of Vermont, have invented a new and Improved Mode of Reducing Cast-Iron and Preparing Cast-Iron Patterns to Mold From, for the use of founders, of which the following is a full and exact description.

The nature of my invention consists in covering the surface of cast-iron with a very finely divided plumbago, or in taking from the surface of cast-iron all that is rustable, by treating with dilute sulphuric acid in a very hot state.

To enable others skilled in the art to make and use my invention, I will proceed to describe its construction and operation.

I first prepare a tub or lead vat large enough to hold the largest piece of cast-iron to be operated upon. When I use a tub I usually heat the dilute acid by placing therein a hot iron or irons; or the acid may be heated when a lead vat is used by placing the vat over a stove or fire. I usually mix my acid in about the proportion of twelve quarts water to one of acid. Into this solution I place my castings, and allow them to remain from one to fifteen minutes, depending upon the result desired to be produced, and when the desired result is obtained I take them out and treat them the same as the old cold dilute-acid process for cast-iron.

The use of dilute sulphuric acid in a cold state for reducing cast-iron has heretofore been practiced, and it has long been known that the chemical action of such acid would be increased in energy by the application of heat to the same. To that extent, therefore, I make no claim to any discovery; but patterns, before being used for castings, are usually coated with wax or some composition upon which dilute sulphuric acid will not act chemically. It is often necessary to remove this coating, which has heretofore been usually done by the tedious process of scraping or filing. I have ascertained that the use of hot acid will remove this coating at once and completely. The use of hot acid is found also to remove the rust that is found on the surface of castings, or the scales with which they are coated when new, effecting both these purposes with a rapidity and an efficiency much greater than are due to the increased chemical action caused by the application of heat. I have discovered also that the surface of castings is left in a much better condition for the reception of the composition known as "Wright's improved composition," for preparing patterns for molding, or even for the reception of common wax. Therefore

What I claim as new, and desire to secure by Letters Patent, is—

1. The use of hot dilute sulphuric acid for the purpose of removing wax or other like composition or coating from the surface of any cast-iron pattern when it becomes desirable to cleanse or reduce the same, substantially as above described.

2. The use of hot dilute sulphuric acid for the purpose of removing rust or scales from the surface of cast-iron patterns, substantially as above shown.

3. The use of hot dilute sulphuric acid for the purpose of preparing an improved surface upon cast-iron patterns for the reception of wax or other composition preparatory to their being used to mold from.

CHARLES R. ELY.

Witnesses:
BRYANT HALL,
HENRY CARLISLE.